March 5, 1968  A. F. WILCOX  3,371,876
COIL WINDING MACHINE
Filed Jan. 24, 1966   10 Sheets-Sheet 10
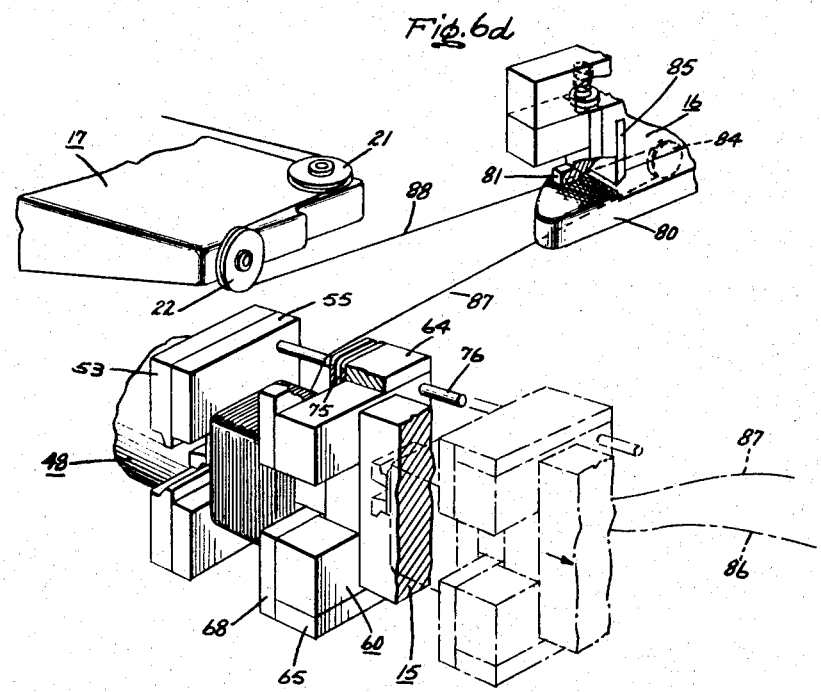
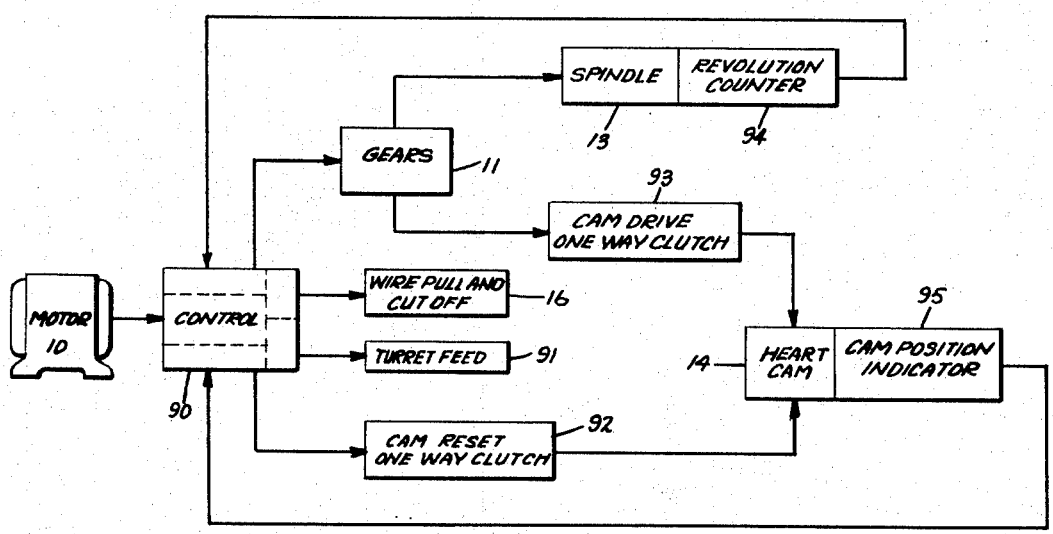
Inventor:
Albert F. Wilcox,
by James G. Williams
Attorney.

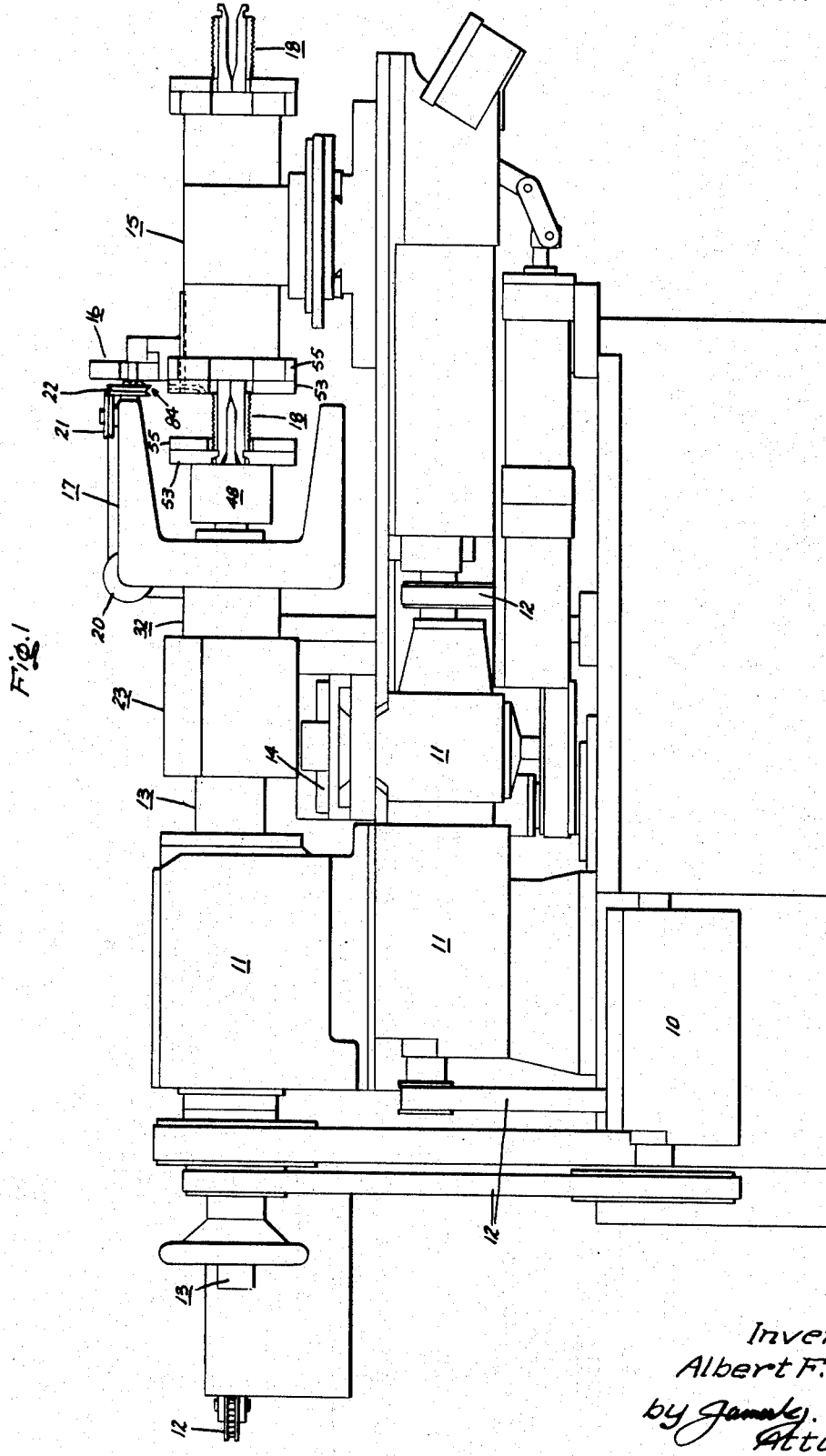

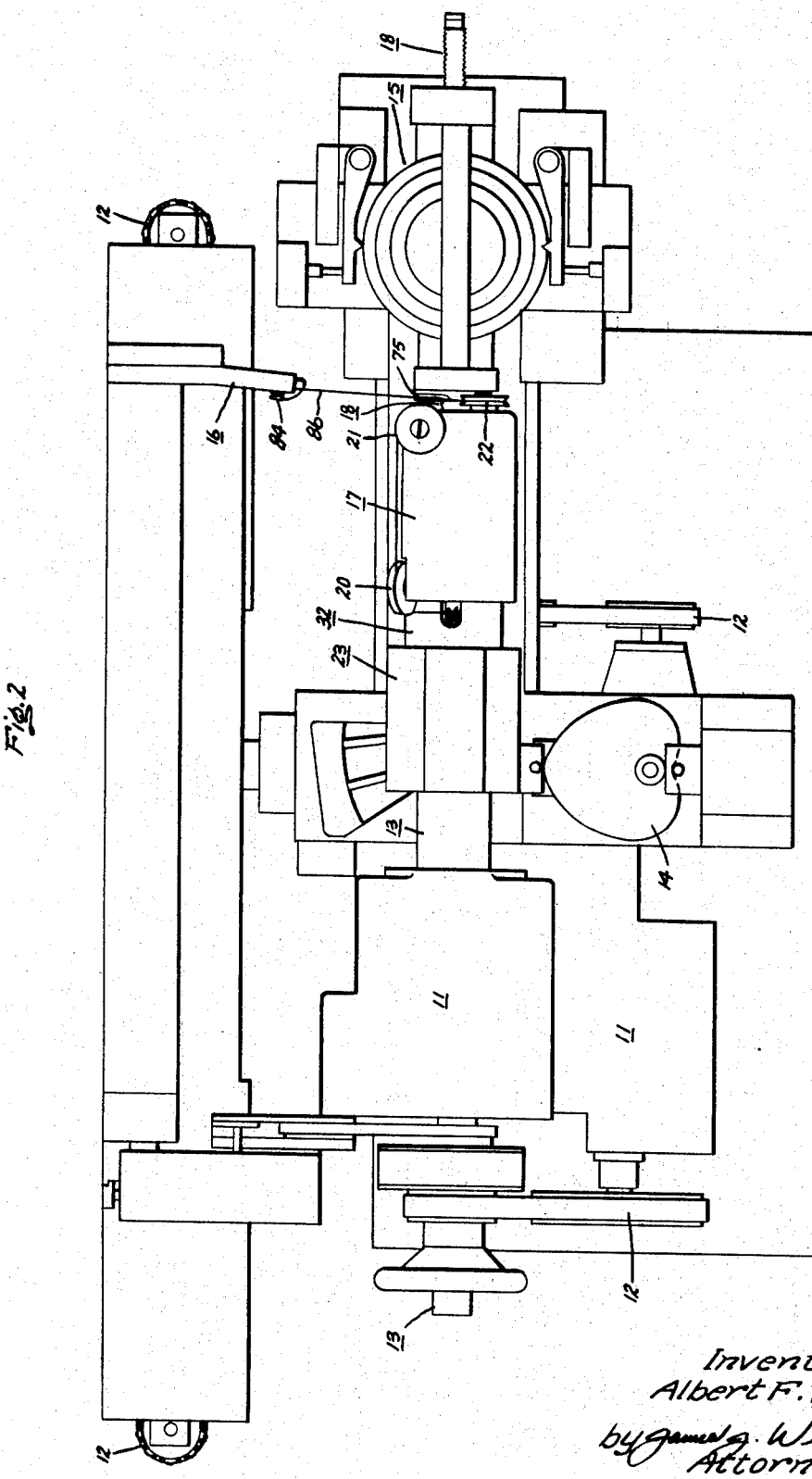

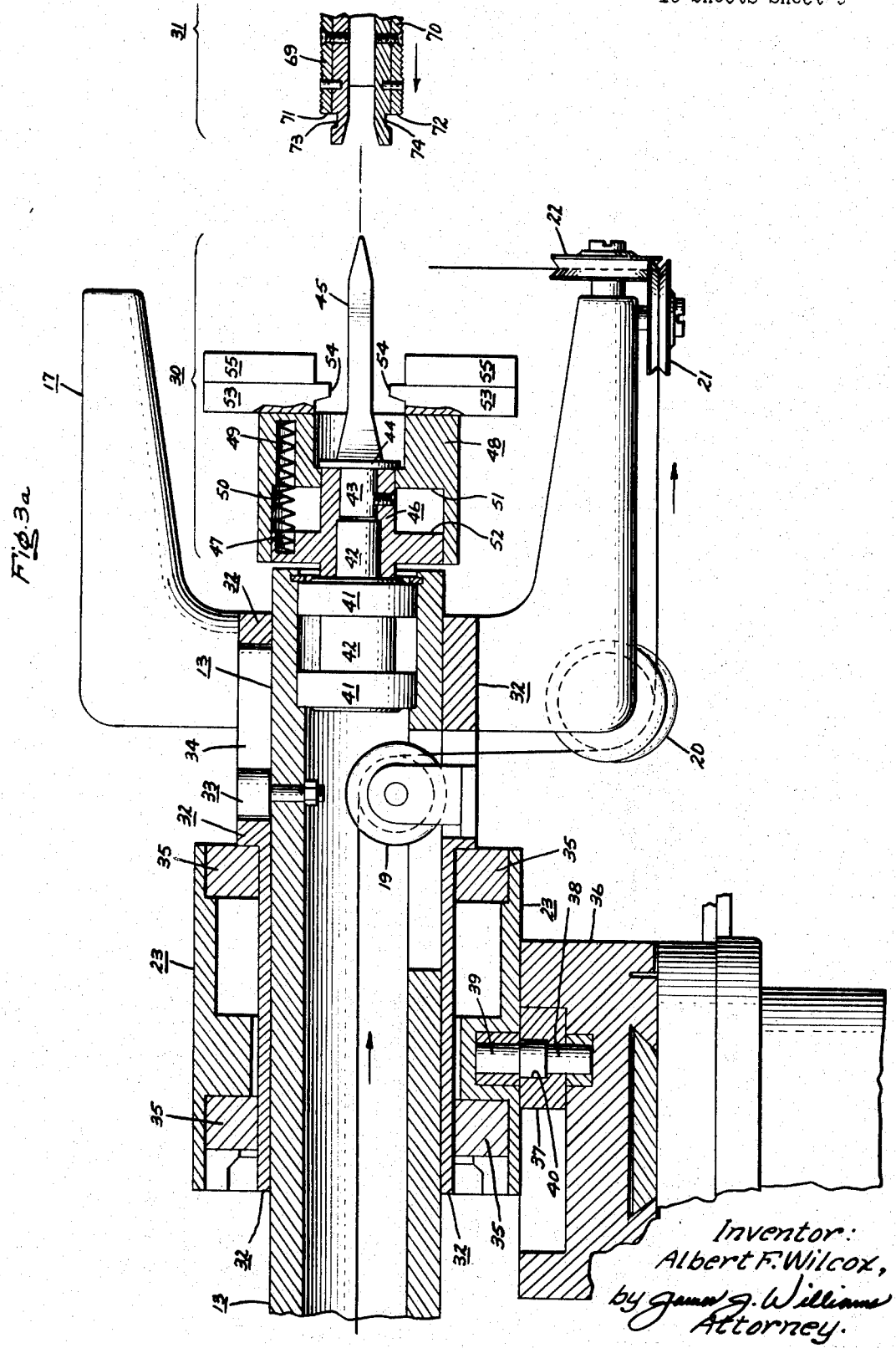

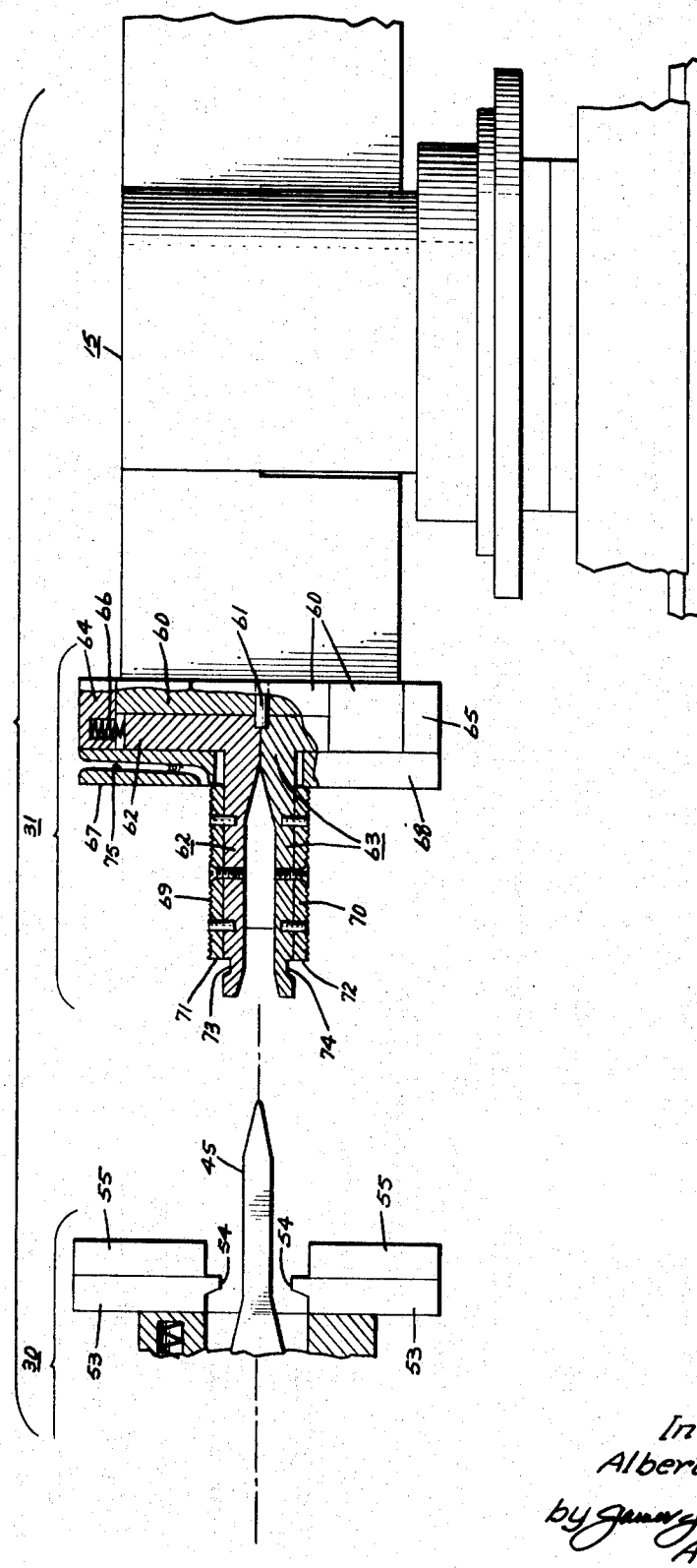

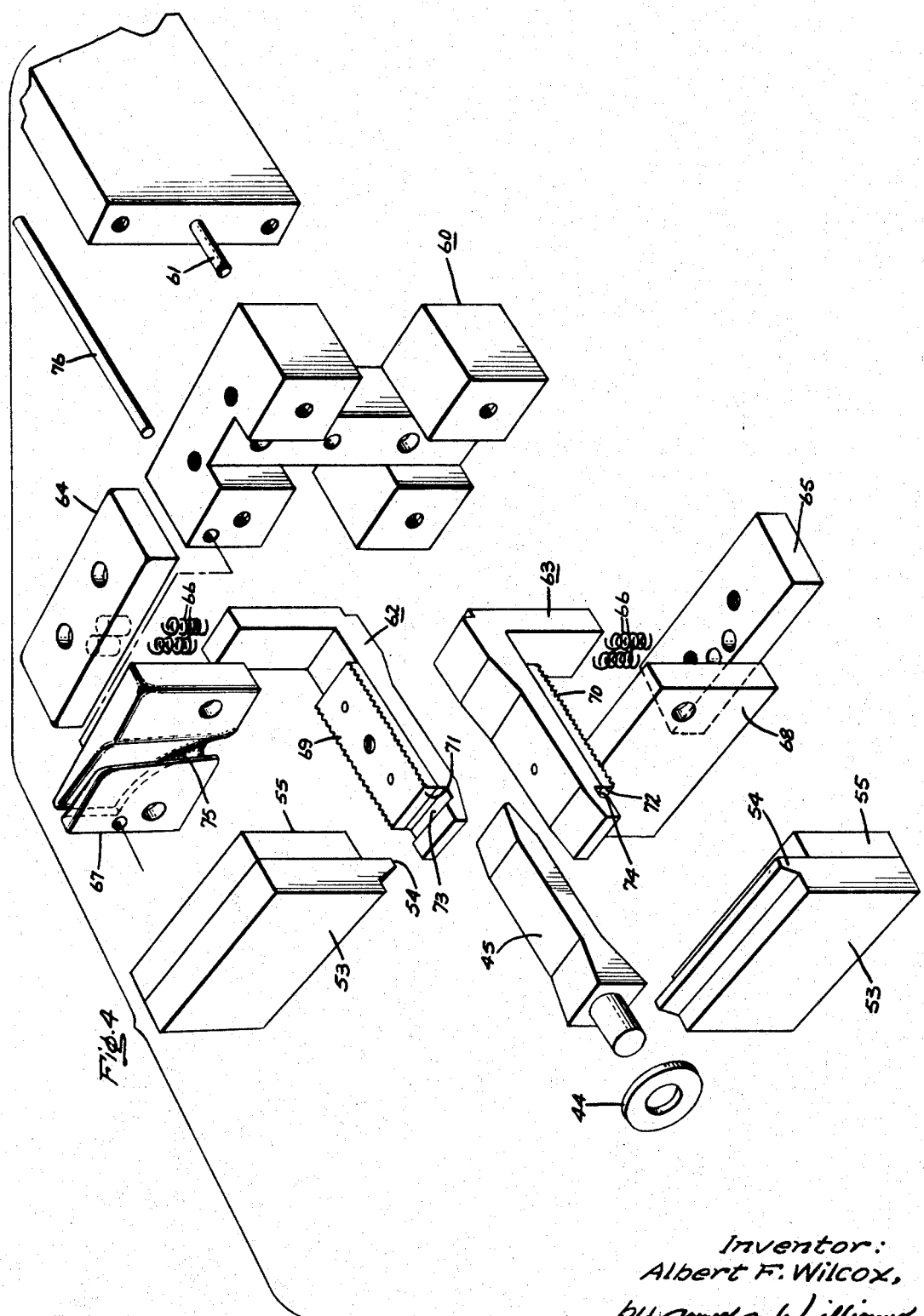

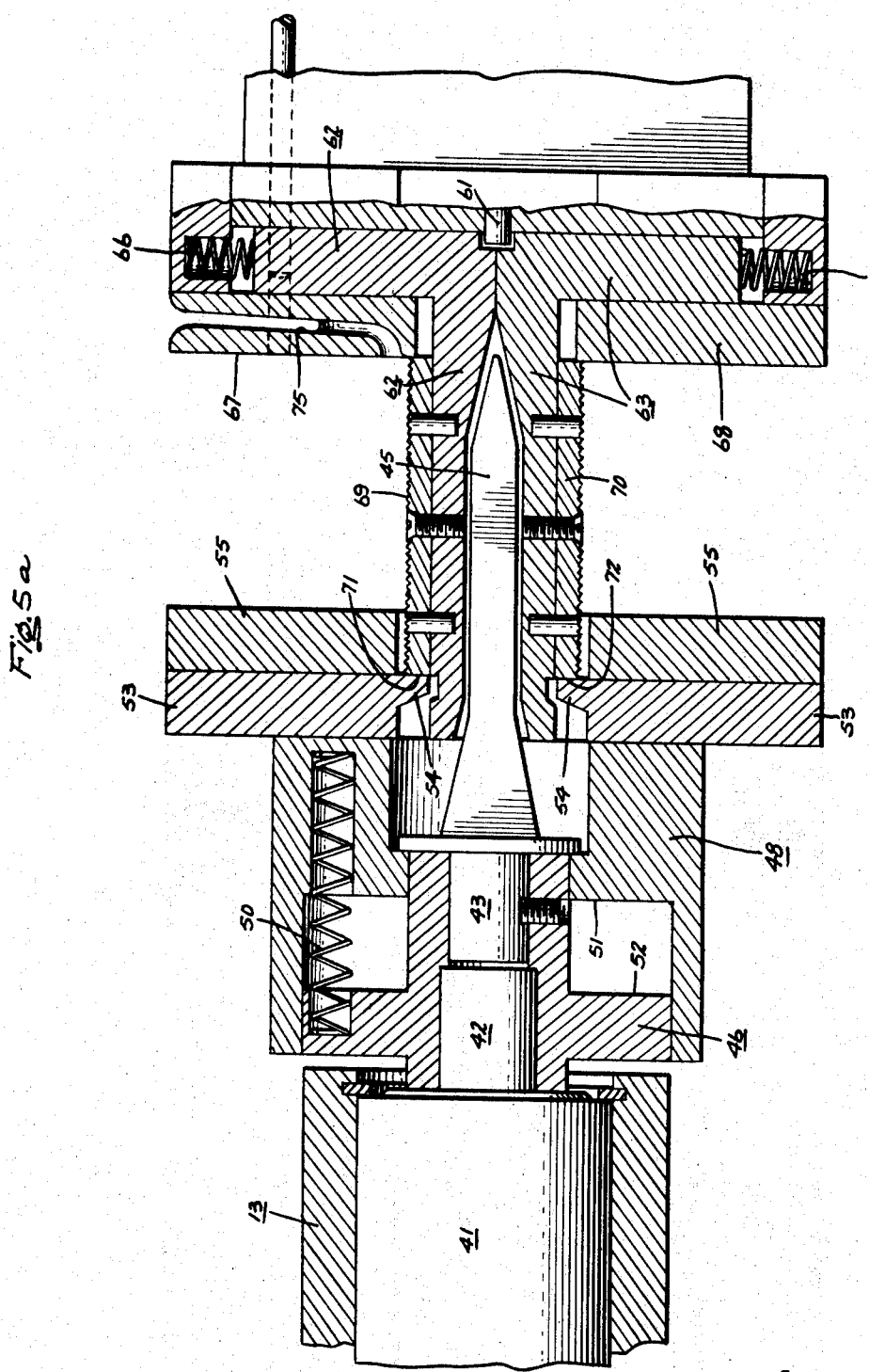

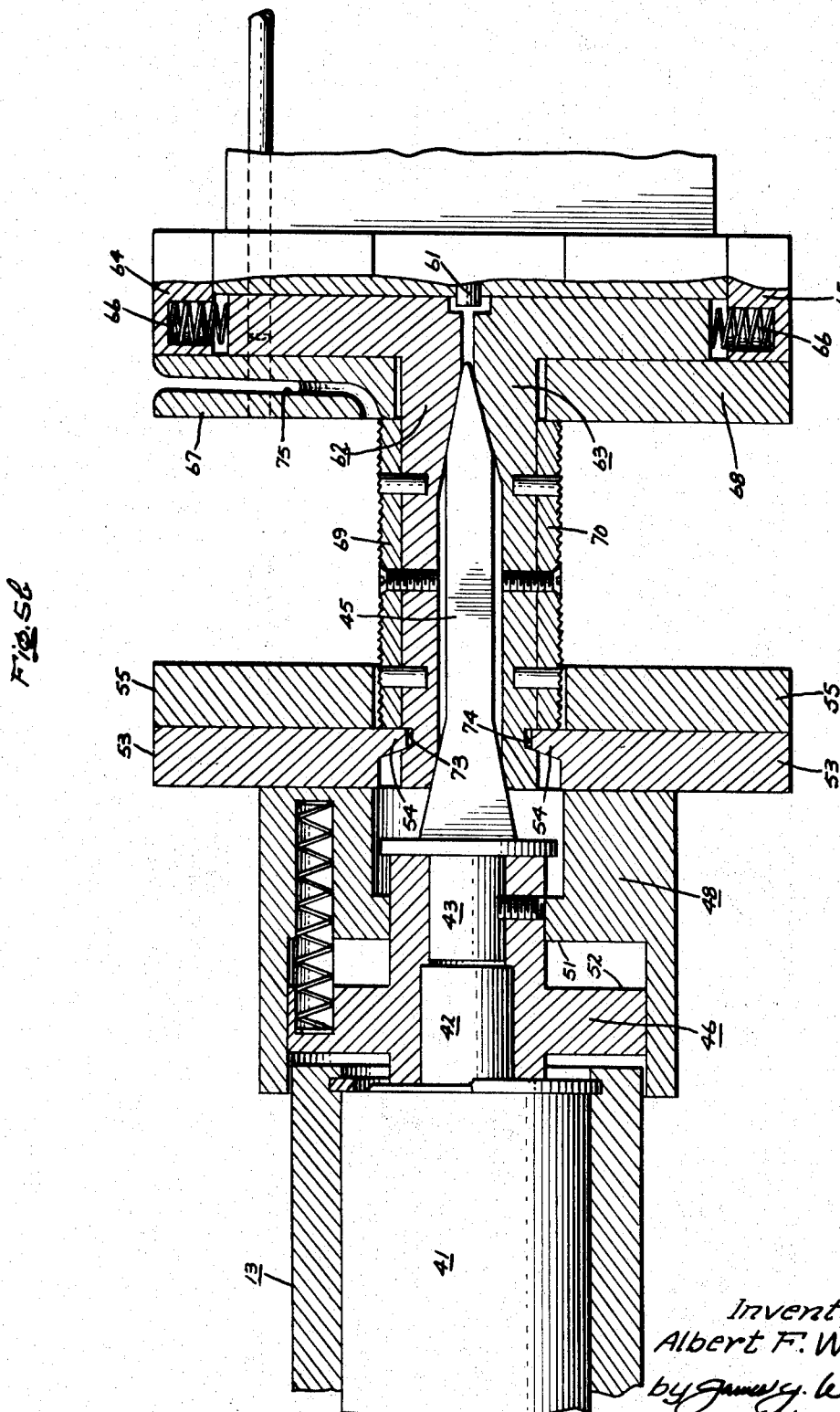

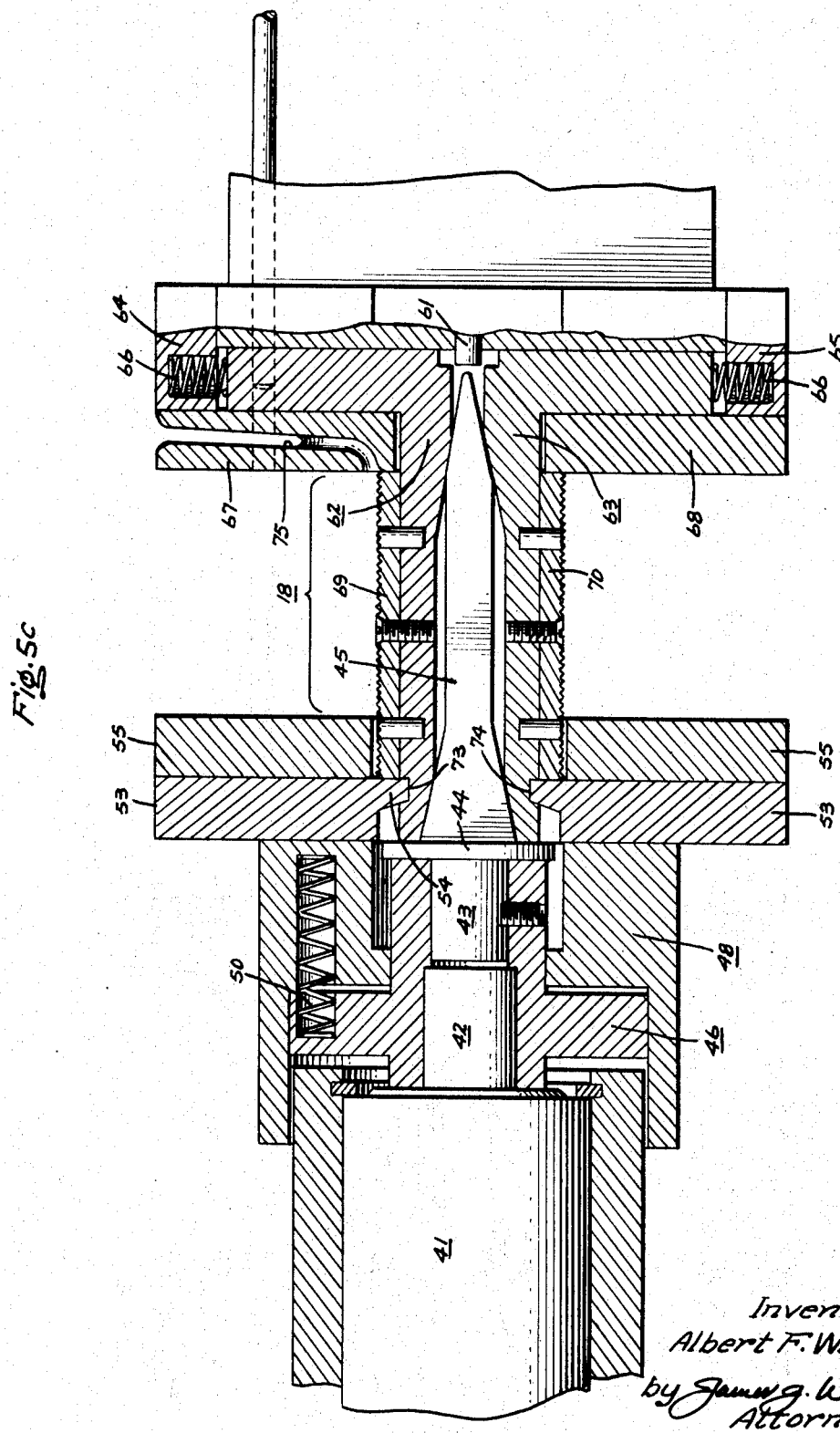

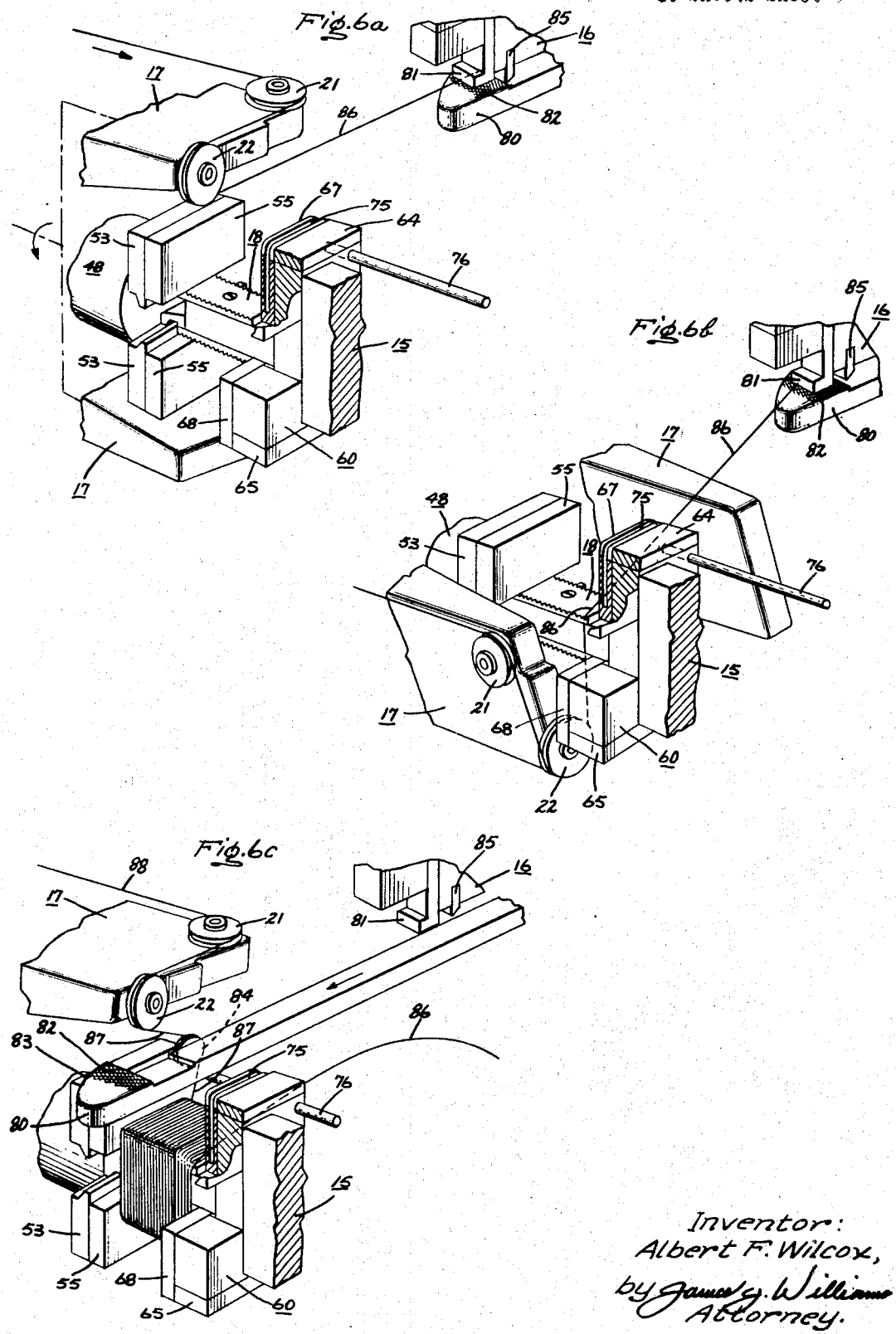

United States Patent Office 3,371,876
Patented Mar. 5, 1968

3,371,876
COIL WINDING MACHINE
Albert F. Wilcox, Yoder, Ind., assignor to General
Electric Company, a corporation of New York
Filed Jan. 24, 1966, Ser. No. 522,753
8 Claims. (Cl. 242—9)

ABSTRACT OF THE DISCLOSURE

A flyer type winding machine for winding coils on a stationary coil form. A rotatable spindle carries the flyer that not only rotates with the spindle but also moves longitudinally along the spindle. A spindle arbor is positioned at one end of the spindle and is capable of being fixed in position in nonrotatable relationship with respect to the spindle. A turret arbor is nonrotatably supported on the machine for longitudinal movement relative to the spindle arbor. The turret arbor and the spindle arbor have cooperating and mating pieces which are securely locked when the turret arbor is advanced into engagement with the spindle arbor to provide the stationary coil form. The cooperating and mating pieces consist of a wedge and flange on the spindle arbor and consist of expandable jaws and flange on the turret arbor which permit a coil form to be adjusted to the desired shape and dimensions.

---

The invention relates to a coil winding machine, and particularly to a coil winding machine of the rotating arm type.

Multilayer or precision coils (sometimes referred to as embedded or nested layer coils) are needed in many applications, particularly electrical devices such as transformers, where it is desirable to provide as many turns of wire as possible in as small an area as possible. Such coils make the most efficient use of winding area because each turn of wire in the initial layer of the coil is in close engagement with the previous turn, and because each turn of wire in each succeeding layer of the coil lies between adjacent turns in the preceding layer. Presently, such coils are wound on a rotating arbor. While the coils so wound are satisfactory from a quality standpoint, they are difficult and slow to wind. The wire must be fed or threaded to the arbor and then attached to the arbor. During winding, the coil cannot be examined or modified, since it is on the rotating arbor. After winding, the coil must be removed from the arbor, and another coil started. This technique is slow and difficult, and is not readily adaptable to mass production or automatic techniques.

Accordingly, an object of the invention is to provide an improved machine for winding precision coils.

Another object of the invention is to provide an improved precision coil winding machine of the flyer type in which the wire is wound around a stationary form.

Another object of the invention is to provide a machine for winding coils precisely around an arbor that can be easily moved from a stationary winding location to permit a wound coil to be removed, and that can be easily returned to the stationary winding location to permit another coil to be wound.

Another object of the invention is to provide an improved precision coil winding machine of the flyer type in which the winding operation can be stopped at any point to permit the coil being wound to be operated on or modified.

Another object of the invention is to provide a machine for winding precision coils that advances a first arbor to a winding position where the first arbor engages a second arbor to provide a rigidly dimensioned and positioned form about which a rotating flyer winds a precision coil.

Present machines for winding precision coils on a rotating arbor have provisions for setting up a single arbor with a wire manually supplied and attached to the arbor at the winding point. While this type of machine does provide a precision coil, it requires a considerable length of time to set up the arbor for each coil to be wound, and it requires a still longer time to insert or set up a different arbor if the size or configuration of the coil is to be changed.

Consequently, another object of the invention is to provide a coil winding machine that winds a coil individually about a stationary form with a relatively small time required between each winding operation.

Another object of the invention is to provide an improved coil winding machine for winding precision coils as automatically as desired, and for permitting the size and configuration of the coils to be easily changed.

Briefly, these and other objects are achieved in accordance with the invention by a coil winding machine on which a rotatable spindle is mounted. The spindle carries a flyer that rotates with the spindle, but that can slide longitudinally along the spindle. The spindle also carries a spindle arbor that is accurately positioned at one end of the spindle and that is mounted on and supported by the spindle so that it can be fixed in position without rotating with the spindle. A turret arbor is mounted on the machine facing the spindle arbor so that the turret arbor can be longitudinally advanced toward and withdrawn from the spindle arbor. The turret arbor and the spindle arbor have cooperating and mating pieces which are securely locked together when the turret arbor is advanced into engagement with the spindle arbor. The cooperating and mating pieces preferably comprise a wedge and flange on the spindle arbor and expandable jaws and a flange on the turret arbor to provide a coil form of the desired shape and size. When a coil is wound, the flyer winds wire around the provided coil form and moves longitudinally one wire diameter per turn with uniform motion along the spindle to lay the turns with precision. After a coil is wound, the turret arbor is withdrawn. The completed coil is removed, and the turret arbor advanced for another coil winding operation.

The invention is particularly pointed out in the claims. The invention may be better understood from the following description given in connection with the accompanying drawing in which:

FIGURE 1 shows a front elevational view of a coil winding machine in accordance with the invention;

FIGURE 2 shows a top plan view of the coil winding machine of FIGURE 1;

FIGURES 3a and 3b show an enlarged front elevational view, partly in section, of the two coil winding machine arbors and flyer;

FIGURE 4 shows an exploded perspective view of the two arbors and their associated pieces;

FIGURES 5a, 5b, and 5c show a longitudinal cross sectional view of a portion of the two arbors when the arbors first make contact, when the arbors are partially engaged, and when the arbors are fully engaged and locked, respectively;

FIGURES 6a, 6b, 6c, and 6d show perspective views to illustrate the various stages of a coil being wound on the coil winding machine in accordance with the invention; and FIGURE 7 shows a block diagram of one embodiment of a control and drive arrangement for the coil winding machine in accordance with the invention.

In the following description, a preferred embodiment of a coil winding machine in accordance with the invention will be described first in general and then in detail. Then, the machine operation during arbor engaging and locking, during winding a coil, and during a complete operation will be described.

General description

One embodiment of a coil winding machine in accordance with the invention is shown generally in the front elevational view and in the top plan view of FIGURES 1 and 2 respectively. This coil winding machine was built from a metal lathe having a bed with longitudinal ways, drive motor and gears, a headstock, and a carriage. After conversion, the coil winding machine shown includes a drive motor 10, gears 11, and belts 12 for driving a hollow spindle 13, a heart cam 14, a turret 15 mounted on the lathe carriage, a wire pull and cutoff 16, and other elements. The spindle 13 is mounted on the ways and supports and rotates a flyer 17 (having two arms for balance) that conveys wire from a source (not shown) and wraps or coils the wire around a stationary coil form 18. The wire passes through the spindle 13 and emerges over a sleeve wire pulley 19 (not shown in FIGURES 1 and 2) and over first, second, and third flyer wire pulleys 20, 21, 22. The wire pays out over the third pulley 22 and is laid onthe stationary form 18. The flyer 17 is always rotated with the spindle 13 but can be moved longitudinally from left to right by a flyer slider and bearing support block 23 which is moved by an adjustable stroke cam and the heart cam 14. The cam arrangement preferably moves the flyer 17 left and right at a uniform rate so that the flyer 17 travels longitudinally one wire diameter for each revolution of the flyer 17. The cammed motion of the flyer 17 is such that for the first 180 degrees of revolution, the flyer 17 tends to position the wire behind its finished location (i.e. toward the previous turn); and that for the last 180 degrees of revolution, the flyer 17 tends to position the wire ahead of its finished location (i.e. toward the subsequent turn location). Grooved winding forms insure proper location of each turn of the wire in the initial layer, and the turns of each subsequent layer are positioned by the turns of the preceding layer. The heart cam 14 and the adjustable stroke cam move the flyer 17, as viewed in FIGURES 1 and 2, right and left for the desired number of layers with the associated turns.

The stationary coil form 18 is provided by a turret arbor mounted on the turret 15, and by a spindle arbor mounted on the spindle 13. The two arbors, as viewed in FIGURE 1, are shown in their engaged and locked condition for a coil to be wound. When a coil is to be wound, the turret 15 is moved on the ways to the left to the position shown so that a pair of turret arbor jaws engage a spindle arbor wedge. The spindle arbor wedge is rotatably mounted on the spindle 13 so that rotation of the spindle 13 can take place with the spindle arbor wedge held stationary. The turret arbor jaws are separated so that jaw locking slots engage and lock with spindle arbor locks to form the solid and stationary coil form 18 shown in FIGURES 1 and 2. With the coil form 18 so provided, the end of the wire is held in the wire pull and cutoff 16, and the flyer 17, located in its right hand position as viewed in FIGURES 1 and 2, is rotated about the coil form 18. The first turn is guided into the precise starting position by a turret arbor slot. Subsequent turns of the first layer are precisely wound in grooves on the coil form 18 by the heart cam 14 and the adjustable stroke cam moving the rotating flyer 17 uniformly to the left (as viewed in FIGURES 1 and 2). When the flyer 17 reaches the left end of its stroke, the cams move the flyer 17 to the right so that the second layer is wound. At the end of the second layer the flyer 17 reverses direction and moves to the left again. Thus, the rotating flyer 17 winds and moves back and forth for as many turns as desired. After the desired number of turns are provided, the flyer rotation and movement are stopped. The wire pull and cutoff 16, mounted on the machine, then moves forward, engages the wire on the flyer 17, and then is withdrawn, pulling a length of wire from the source. Then, clamping the wire going to the flyer, the wire pull and cutoff 16 cuts the wire going to the turns just wound. The turret arbor moves on the ways to the right, carrying the completed coil. As the turret arbor moves, its jaws separate from the spindle arbor wedge. The completed coil may be withdrawn from the jaws and another coil wound in the manner just described.

The turret 15 shown in FIGURES 1 and 2 is provided with two arbors and made rotatable, so that an operator may set up one arbor for a coil to be wound while the flyer is winding a coil on the other arbor. The operator may insert or place one or more pieces of adhesive tape on the turret arbor jaws so that a coil will be wound over the tape, after which the tape is wrapped completely around the finished coil to hold the turns in place. Then, after a coil is wound and the turret withdrawn from the flyer 17, the turret 15 may be rotated 180 degrees so that the newly set up arbor faces the flyer 17 and the previously wound coil faces the operator. The previously wound coil may be withdrawn, and additional operations may be performed on the completed coil. At the same time, the rotated turret 15 moves forward into engagement so that the turret arbor and the spindle arbor engage and another winding operation may be taking place.

The coil winding machine may also be provided with a number of features. First, the flyer 17 may be stopped at any point in its winding operation so that operations, such as providing a tap, may be performed on the coil. Second, any number of turns may be wound on a coil, and so a coil may be completed with the flyer 17 at any location in its back and forth stroke. In order that subsequent coils may always be begun at the extreme right position as viewed in FIGURES 1 and 2, the heart cam 14 may be rotated through a one-way clutch arrangement so as to return the flyer 17 to its extreme right position for starting another coil. This rotation of the heart cam 14 may be made without rotation of the spindle 13 and flyer 17. And third, the turret 15 may have only a single turret arbor, or may have any number of turret arbors, depending on the type of operation in which the winding machine is used. Finally, the placing of tape or other forms on the turret arbors, the removal of completed coils, and other operations may be made by an operator or may be automatic.

Detailed description

FIGURES 3a and 3b show enlarged front elevational views, partly in section, of the spindle 13, the adjustable stroke cam, the spindle arbor 30, and the turret arbor 31. The two views actually represent a single view along a common axis as indicated, but have been shown on separate sheets so that larger and clearer details can be shown. Also, the two views show the turrent arbor 31 and the spindle arbor 30 in the separated or disengaged position, and the flyer 17 in a different rotational position relative to FIGURES 1 and 2. As shown in FIGURE 3a, the spindle 13 is a hollow, elongated cylindrical shaft which is longitudinally fixed on the machine but which can be rotated about its longitudinal axis by suitable gears (not shown). Around the spindle 13 is a flyer sleeve 32 which is supported by and which rotates with the spindle 13. The flyer sleeve 32 is also an elongated cylindrical shaft which surrounds the spindle 13 with just enough clearance to permit the sleeve 32 to be moved longitudinally along the spindle 13. The flyer sleeve 32 is driven in rotation with the spindle 13 by means of a flyer drive roller 33 which is attached to the spindle 13, which extends radially outward from the spindle 13, and which engages the sides of a longitudinally elongated flyer drive roller slot 34. The flyer drive roller 33 presses against the sides of the flyer drive roller slot 34 and causes the flyer sleeve 32 to rotate with the spindle 13. The flyer drive roller 33 permits the flyer sleeve 32 to be moved longitudinally along the spindle 13 within the confines of the length of the drive roller slot 34.

The flyer sleeve 32 rotatably supports two flyer sleeve bearings 35 which can transmit longitudinal thrust to the flyer sleeve 32 so that as the flyer sleeve 32 rotates with the spindle 13, it can also be moved along the spindle 13. The flyer sleeve bearings 35 hold and support the flyer slider and bearing support block 23. The flyer slider and bearing support block 23 engages a cam block 36 which is supported on ways for back and forth movement (perpendicular to the plane of the paper as viewed in FIGURE 3a). The cam block 36 prevents the flyer slider and bearing support block 23 from rotating, and also includes a slotted, adjustable stroke cam 37 which can be horizontally pivoted about a cam pivot 38, and then locked. A block cam follower 39 is positioned in the slot 40 of the adjustable stroke cam 37 and is rotatably fastened to the bottom of the flyer slider and bearing support block 23. The cam block 36 with its adjustable stroke cam 37 and slot 40 is moved back and forth perpendicular to the plane of the paper of FIGURE 3a by rotation of the heart cam 14 (shown in the plan view in FIGURE 2). As the cam block 36 is so moved, the block cam follower 39 (following the slot 40 in the adjustable stroke cam 37) causes the flyer slider and bearing support block 23 to move left and right. The distance of this left and right motion is determined by the cam stroke and the angle at which the adjustable stroke cam 37 and its slot 40 have been locked. Motion of the flyer slider and bearing support block 23 is transmitted to the flyer sleeve 32 through the flyer sleeve bearings 35 so as to move the flyer sleeve 32, while rotating or stationary, longitudinally along the spindle 13 while rotating or stationary. The longitudinal stroke distance of the flyer 17 is made equal to the wire diameter times the number of turns per layer and times a winding form factor (which may be some number slightly greater or smaller than one to allow for wire variations and spacing variations). Mathematically expressed, the flyer slider and bearing support block 23 has a left and right (as viewed in FIGURE 3a) stroke or travel equal to the cam block in and out (as viewed in FIGURE 3a) stroke or travel multiplied by the tangent of the horizontal angle between the cam block 36 line of motion and the adjustable stroke cam slot 40. As a practical matter, this angle is limited to a practical value of 30 or 40 degress because of friction.

The flyer 17 is generally U-shaped to provide two diametrically opposed and preferably dynamically balanced arms, and is rigidly fastened to the flyer sleeve 32 with the two arms extending symmetrically (relative to the axis of rotation) beyond the spindle 13. Thus, as the flyer sleeve 32 rotates with the spindle 13 or moves longitudinally with the flyer slider and bearing support block 23, or rotates and moves, the flyer 17 also rotates, or moves, or rotates and moves. The flyer 17 winds wire on the coil form 18 provided by the two arbors 30, 31. This wire is supplied by a reel or spool (not shown) and enters the left end of the spindle 13. The wire passes through the hollow interior of the spindle 13, and passes over the sleeve wire pulley 19. The sleeve wire pulley 19 is fastened to the flyer sleeve 32 and rotates with it and with the spindle 13, and has its groove tangent to the longitudinal axis and in a plane passing through the longitudinal axis of the structure. One arm of the flyer 17 carries the first, second, and third pulleys 20, 21, 22. The first pulley 20 preferably has its groove positioned in the same plane at the left end of the flyer 17 for receiving wire from the sleeve wire pulley 19 and directing this wire to the second flyer wire pulley 21. The second flyer wire pulley 21 directs the wire to the third flyer wire pulley 22 which preferably has its groove positioned in a plane that is perpendicular to the longitudinal axis of the structure. The wire leaves the groove of the third flyer wire pulley 22 and is wound on the coil form 18 provided by the arbors. Thus, the rotating flyer 17 draws wire from the source and winds it around the stationary coil form 18 provided by the spindle arbor 30 and the turret arbor 31.

A spindle arbor bearing 41 is mounted in the right hand end of the spindle 13 for rotatably supporting a spindle arbor bearing shaft 42. The spindle arbor bearing shaft 42 may thus be held or fixed so that it provides support to or receives support from the spindle 13 through the spindle arbor bearing 41, but presents very little resistance or friction to spindle rotation. The spindle arbor bearing shaft 42 supports a spindle arbor wedge shaft 43 and washer 44 with an attached spindle arbor wedge 45 through a cylindrical, concentric spindle arbor shaft sleeve 46. The spindle arbor shaft sleeve 46 has three circular holes 47 extending longitudinally and equally spaced around a common circular face 52 on a portion of the spindle arbor shaft sleeve 46. A cylindrical spindle arbor hub 48 is concentrically positioned on and generally outside the spindle arbor shaft sleeve 46. The spindle arbor hub 48 can slide longitudinally on the spindle arbor shaft sleeve 46 at the two common circular surfaces of contact. The spindle arbor hub 48 also has three holes 49 positioned in a circular face 51 to correspond and align with the three holes 47 in the spindle arbor shaft sleeve 46. An expansion spring 50 is positioned in each pair of the aligned holes 47, 49. These springs 50 tend to urge the spindle arbor hub 48 to its extreme right hand position shown in FIGURE 3a, this extreme position being determined by the washer 44 on the spindle arbor wedge shaft 43. The spindle arbor hub 48 may be moved to the left against the springs 50 to a left hand position determined by the turret arbor 31 being stopped by the washer 44. Upper and lower spindle arbor locks 53 are attached to the right end of the spindle arbor hub 48 in diametrically opposed and symmetrically oriented positions. These locks 53 carry respective locking keys 54 having a vertical front surface and a bevelled rear surface. Upper and lower spindle arbor flanges 55 are respectively attached to the spindle arbor locks 53 in diametrically opposed and symmetrically oriented positions. These flanges 55 may be horizontally spaced from the locks 53 by spacer blocks to change the horizontal dimension of the coil to be wound. The spindle arbor wedge 45 attached to the spindle arbor wedge shaft 43 extends to the right along the machine longitudinal axis.

The turret 15 shown in FIGURE 3b may include one or more turret arbors 31, the number of such arbors 31 depending on the particular application for the coil winding machine. In general, it is preferable that the turret 15 be rotatable about a vertical axis, and indexed so it can be turned to precise locations. The turret 15 can be moved left and right along ways by any suitable means. Only one turret arbor 31 is shown and explained, but it is to be understood that any number of such arbors may be provided. The turret arbor 31 has a turret arbor jaw slide 60 which is fastened to the turret 15, and which may be aligned by a pin 61 to provide a vertical rectangular groove or slot in which upper and lower L-shaped turret arbor jaws 62, 63 may slide along their respective bases. The other portions of the two L-shaped jaws 62, 63 extend symmetrically (to the left as viewed in FIGURE 3b) along the machine longitutdinal axis toward the spindle arbor 30. The turret arbor jaws 62, 63 are held in place by upper and lower turret arbor jaw retainers 64, 65 which have respective springs 66 that tend to force the turret arbor jaws 62, 63 inward toward each other to the position shown. The jaws 62, 63 are always initially centered above and below the center horizontal axis by the pin 61. Upper and lower turret arbor flanges 67, 68 are respectively positioned in front (i.e., to the left) of the bases of the L-shaped turret arbor jaws 62, 63 to retain the jaws 62, 63 in the respective part of their slot, and to provide a part of the winding form 18. The turret arbor jaws 62, 63 carry respective upper and lower winding plates 69, 70 on their extended portions respectively. The winding plates 69, 70 are accurately positioned and held by pins and screws. These plates 69, 70 preferably just clear the left hand vertical faces of the turret arbor flanges 67, 68. Each of the winding plates 69, 70 preferably has accurately positioned grooves on its outer longitudinal edges or corners so that the turns of the first coil layer are precisely positioned. The plates 69, 70 also have spindle arbor compressing shoulders 71, 72 at their left ends which are respectively aligned with jaw locking slots 73, 74 on the turret arbor jaws 62, 63, and which are also preferably aligned vertically with each other. The jaw locking slots 73, 74 are dimensioned and shaped to receive the locking keys 54 with close tolerances. The turret arbor 31 thus provides an accurately positioned rectangular coil form 18 comprised of the two winding plates 69, 70, and the two flanges 67, 68. The coil form 18 may also include vertical side plates on the front and back if needed or desired. The two winding plates 69, 70 are movable in vertical directions by vertical motion of the turret arbor jaws 62, 63 in the turret arbor jaw slide 60. The distance of this motion is determined by the space between the bases of the turret arbor jaws 62, 63 and their respective turret arbor jaw retainers 64, 65.

The turret 15 is movable from right to left on the ways, and the turret arbor 31 and spindle arbor 30 are so designed and dimensioned that the extensions of the turret arbor jaws 62, 63 fit above and below the spindle arbor wedge 45 and form a solid, fixed structure with predetermined dimensions and flange spacings on which the wire from the third flyer wire pulley 22 may be wound. As will be described, this structure is substantial and rigid, and does not change despite high winding pressures. Further, this winding is done with the turret arbor jaws 62, 63 in their expanded position so that after a winding is completed, the turret arbor jaws 62, 63 may be retracted and the completed winding easily removed.

FIGURE 4 shows an exploded perspective view of certain elements that form the spindle arbor 30 and the turret arbor 31. It will be noted that the upper turret arbor flange 67 has a slot or groove 75, this groove 75 serving as a starting groove for the winding of each coil. The groove 75 shown is smoothly shaped to lay the wire at the top and right hand edge of the upper winding plate 69 as viewed in FIGURE 3b. However, other grooves, particularly ones that are more easily fabricated, may be provided. And a retainer pin 76 is inserted in the jaw slide 60 and the upper flange 67 to keep the last turn of a completed coil intact during wire pull and cutoff, as will be explained subsequently.

*Arbor locking operation*

One of the important features and advantages of the coil winding machine of the invention is that the turret arbor 31 is movable and the spindle 13 is rotatable, but the two arbors 30, 31 can be engaged and locked to provide a rigid and dimensionally fixed structure on which coils may be wound by the flyer 17. Since this is an important feature of the machine, its operation will be discussed in detail in connection with FIGURES 5a, 5b, and 5c. FIGURES 3a and 3b show the turret arbor 30 and the spindle arbor 31 separated prior to initiation of a winding cycle. After a winding cycle is initiated, as will be described in connection with FIGURE 7, the turret 15 carrying the turret arbor 31 is advanced to the left toward the spindle arbor 30. As the turret arbor 31 moves to the left, its two turret arbor jaws 62, 63 are respectively above and below the spindle arbor wedge 45. The turret arbor 31 continues to advance with the front ends of the jaws 62, 63 clearing (passing inside) the locking keys 54 on the spindle arbor locks 53, and the front ends of the winding plates 69, 70 clearing (passing inside) the spindle arbor flanges 55. The first engagement occurs when the front surfaces of the spindle arbor compressing shoulders 71, 72 engage the front surfaces of the locking keys 54 of the spindle arbor locks 53. This condition is shown in FIGURE 5a. As the turret arbor 31 continues to move to the left, the compressing shoulders 71, 72 move or push the spindle arbor locks 53, the spindle arbor flanges 55, and the spindle arbor hub 48 to the left. This movement compresses the spindle arbor springs 50 and the spindle arbor hub 48 slides on the spindle arbor shaft sleeve 46.

As the turret arbor 31 continues to advance, the turret arbor jaws 62, 63 are expanded or forced outward by the sloped inner surfaces of the turret arbor jaws 62, 63 engaging the corresponding sloped outer surfaces on the spindle arbor wedge 45. As shown in FIGURE 5b, this expansion is caused by both the right and left slopes of the wedge 45 engaging the right and left slopes of the turret arbor jaws 62, 63 respectively, so as to provide parallel expansion. FIGURE 5b shows the relative positions of the turret arbor and elements and the spindle arbor and elements at approximately the mid-position of travel of the spindle arbor hub 48, the spindle arbor locks 53, and the spindle arbor flanges 55. In this condition, the longitudinal opening between the face 51 of the spindle arbor hub 48 and the face 52 of the spindle arbor shaft sleeve 46 has been reduced to approximately one-half its fully open space. It will be noticed that the spindle arbor wedge 45 does not move, since it is longitudinally fixed in position by the spindle 13 and the spindle arbor bearing 41. As the turret arbor jaws 62, 63 are forced outward or expanded, it will be seen how the jaw locking slots 73, 74 are respectively engaged by the keys 54 on the spindle arbor locks 53. It will also be seen in FIGURE 5b how the bases of the two turret arbor jaws 62, 63 begin to separate.

The turret arbor 31 continues to move to the left. As the jaws 62, 63 advance, their sloping surfaces continue to provide positive outward movement or expansion of the turret arbor jaws 62, 63. This movement causes the locking keys 54 on the spindle arbor locks 53 to be fully seated in the respective jaw locking slots 73, 74. And, if the various parts are properly and accurately dimensioned, the forward edges of the turret arbor jaws 62, 63 strike the washer 44 of the spindle arbor wedge 45 at the same time the upper and lower portions of the jaws 62, 63 engage their respective turret arbor flanges 67, 68, and at the same time that the locking keys 54 on the spindle arbor locks 53 are fully seated in the jaw locking slots 73, 74. Also at this time, the inner sloping surfaces of the turret arbor jaws 62, 63 are still well supported by corresponding outer sloping surfaces on the spindle arbor wedge 45. This condition is shown in FIGURE 5c. In this condition, the spindle arbor 30 and the turret arbor 31 are locked together to form the rigid winding form 18. The winding form 18 shown in FIGURE 5c is a very rigid and stable structure, and is able to withstand relatively high winding forces without becoming disassembled. This is because the sloping surfaces of the jaws 62, 63 and wedge 45 form a relatively small angle (12 degrees in one embodiment) with the longitudinal axis of the machine, and the component of force along the longitudinal axis (this being the force tending to move the jaws 62, 63 to the right and unlock the structure) is the force exerted by the winding multiplied by the tangent of the slope angle. If the winding force is ten pounds, the force needed to keep the arbors 30, 31 engaged and locked is ten pounds times 0.213, or 2.13 pounds. This force can easily be provided to the turret by the motor 10, or compressed air, or some other sutiable means, such as used to rotate and advance and retract the turret 15. While smaller slope angles would reduce the force needed to keep the arbors 30, 31 engaged and locked, the lower practical limit is about 8 degrees. For angles smaller than 8 degrees, the friction between the parts might prevent the arbors 30, 31 from unlocking. In this regard, friction has been reduced by providing a bevel from a vertical plane of 15 degrees on the back faces of the locking keys 54 and on the corresponding faces of the locking slots 73, 74.

After a coil is wound, the turret arbor 30 and the spindle arbor 31 are separated and would take the positions shown in FIGURES 5c, 5b, 5a and 3a and 3b respectively. As the two arbors 30, 31 are separated, the turret arbor jaws 62, 63 are compressed together again by their springs 66 so as to provide a reduced inner dimension that makes removal of the completed winding relatively simple.

As shown in FIGURES 3b, 5a, 5b, and 5c, the turret arbor flanges 67, 68 extend downward with very close tolerance behind the winding plates 69, 70. It is desirable particularly when small sizes of wire are being wound, that these flanges 67, 68 extend downward as far as possible to provide as much support around the corner as possible without interfering with the outward movement or expansion of the turret arbor jaws 62, 63. The same is true of the spindle arbor flanges 55. However, a vertical clearance between the spindle arbor flanges 55 and the winding plates 69, 70 must be provided in order to permit the winding plates 69, 70 to pass inwardly or beneath the spindle arbor flanges 55 and then expand outward to their final position. If need be, the spindle arbor flanges 55 may be extended downward around the outer front and back faces of the winding plates 69, 70 to provide the necessary winding flanges around the corners of the winding plates 69, 70. These flange extensions are not shown in FIGURES 3a, 4, 5a, 5b, and 5c in order that the position of the winding form 18 during the various locking stages can be seen better. Also, vertical plates to provide front and back winding surfaces in vertical planes may be provided if desired or necessary. These plates could be attached to the turret 15, or to each of the turret arbor jaws 62, 63 at the left and right to provide surfaces that can move with the jaws.

Coil winding operation

FIGURES 6a, 6b, 6c, and 6d show perspective views to illustrate the various stages of a coil being wound on the coil winding machine in accordance with the invention. These four figures show details of the coil form 18, the flyer 17, and the wire pull and cutoff 16, with portions broken away so that operation of the machine during a coil winding can be seen clearly. In the following description, reference to the plan view of the coil winding machine shown in FIGURE 2 may be helpful.

Initially, it is assumed that the machine has been operating, and that wire from a supply reel is threaded through the spindle 13, over the sleeve wire pulley 19, and over the three flyer wire pulleys 20, 21, 22. The wire end is held between a lower jaw 80 and an upper jaw 81 carried by the wire pull and cutoff 16. As shown in FIGURE 6a, the spindle arbor and the turret arbor are engaged and locked, and the retainer pin 76 is pulled back so that the coil form 18 is ready to receive a winding. The vertical surfaces on the coil form may be provided with adhesive tape to wrap around the completed coil and hold the turns fixed in position. When the coil is to be wound, the flyer 17 begins to rotate in a counter clockwise direction as viewed in FIGURE 6a. As the flyer 17 rotates in this counter clockwise direction, and with the wire end held in the jaws 80, 81, it pulls more wire from the supply. The wire 86 between the third flyer wire pulley 22 and the wire pull and cutoff 16 moves vertically downward into the turret arbor groove 75. This causes the wire 86 to emerge from the groove 75 at the right hand edge of the coil form 18 and to lay in the first groove provided on the winding plates. FIGURE 6b shows the flyer 17 after having rotated approximately 90 degrees, and shows the wire 86 laying in the turret arbor groove 75 and passing over the first winding plate groove and down along the front vertical face of the coil form 18. Reference to FIGURE 2 will be helpful at this point in visualizing how the wire 86 is guided or fed downward into the turrent arbor groove 75. In FIGURE 2, the flyer 17 is shown at a position corresponding to its position shown in FIGURE 6a. When the flyer 17 begins to rotate, it will, with respect to FIGURE 2 move downward and move the groove of the third flyer wire pulley 22 not only downward, as viewed in FIGURE 2, but also away from the end of the wire 86 held at the wire pull and cutoff 16. The length of wire 86 (between the pulley 22 and its held end) moves to the right and down into the groove 75. The groove 75 must therefore be shaped and positioned to receive and direct the wire to the winding form 18. Thus, at the start, the flyer 17 causes the wire 86 to pivot radially about a center that is located at the point at which its end is clamped in the wire pull and cutoff 16, and to be directed into the groove 75.

Rotation of the flyer 17 continues until the desired number of coil turns are provided, at which time the flyer is stopped in the position shown in FIGURE 6c. FIGURE 6c also shows the initial turn under the subsequently provided turns leading out in the turret arbor groove 75. When the flyer 17 is stopped, the retainer pin 76 (shown in retracted positions in FIGURES 6a and 6b) is moved forward (automatically or manually) until its forward edge engages the upper spindle arbor flange 55. Then, appropriate mechanisms are operated to cause the upper jaw 81 to release the end of the wire 86 leading to the start of the winding. The subsequent turns hold the initial turns in place. The same mechanisms cause the lower jaw 80 of the wire pull and cutoff 16 to move forward. This lower jaw 80 has a knurled or grooved upper horizontal surface 82 for firmly clamping the wire, and also has a curved surface 83 which permits the lower jaw 80 to pass under and to the right of the length of wire 87 between the finished coil and the third flyer wire pulley 22. A small pulley 84 carried by the lower jaw 80 also passes by the length of wire 87 between the coil and third flyer wire pulley 22 so that when the lower jaw 80 is retracted, the jaw pulley 84 pulls more wire 88 from the supply of wire. The retainer pin 76 prevents the wire 87 from being unwound from the completed coil. In FIGURE 6c, the lower jaw 80 has moved back a short distance, with the jaw pulley 84 bringing the wire 88 back with it.

FIGURE 6d shows the lower jaw 80 in its retracted position, and shows how the wire 88 is pulled by the jaw pulley 84 from the source against the tension of the length of wire 87 passing over the retainer pin 76 and leading to the completed coil. When the lower jaw is retracted, the upper jaw 81 moves downward to clamp the wire 88, and a cutter 85 severs or cuts the wire 87 between the clamped portion and the jaw pulley 84 so that the completed coil with its ends of wire 86, 87 is released. And the end of the wire leading to the third flyer wire pulley 22 and the source is clamped. The clamping and cutting may be provided by a single motion or sequential motions. Also at this time, tapes placed on the winding form prior to a winding cycle may have their ends folded toward each other around the coil to hold the turns in place against inherent springiness and handling. Then, the turret is retracted to separate the turret arbor from the spindle arbor and withdraw the completed coil, as indicated by the phantom lines in FIGURE 6d.

The turret 15 can be rotated so that the completed coil may be removed and a newly prepared turret arbor 31 placed in position and then moved forward to engage the spindle arbor 30 and provide the engaged and locked coil form 18. This is the condition shown in FIGURE 6a, which is the condition at which the winding operation began. Thus, it will be seen that the wire pull and cutoff 16 holds the leading end of the wire so the flyer 17 can pull wire from the supply during winding, then releases this leading end which is then held by the wound turns, moves forward and pulls back an additional length of wire from the supply against the tension of the completed winding, clamps the wire from the supply, and cuts off the trailing wire on the side of the clamp toward the completed coil. Thus, the wire is held during winding, and is cut to free the completed winding and hold the wire for a subsequent winding.

*Complete operation*

FIGURE 7 shows a block diagram of the operating elements (some of which are illustrated and described in connection with FIGURES 1 and 2) of a coil winding machine in accordance with this invention as directed by a suitable control 90. This control 90 may be a taped control device or may be an operator's panel with pushbuttons to start and stop each operation to be described. In any case, it is to be understood that the method for initiating or starting and stopping each operation may be made in any manner, and the sequence may be varied to some extent.

In FIGURE 7, a suitable prime mover such as the electric motor 10 has its output power or drive supplied to the control 90 which, in response to automatic or operator instructions, selectively applies this power to the gears 11, to the wire pull and cutoff 16, to a turret feed 91, and to a cam reset one-way clutch 92. In a cycle of operation, it is assumed that wire has been threaded through the spindle and flyer pulleys, and its end held by the wire pull and cutoff 16. A turret arbor 31 is set up or prepared for a new coil (either by a machine or by an operator). The turret 15 is then advanced by the turret feed 91 so that the turret arbor 31 and spindle arbor 30 form the rigid and locked winding form 18. When the two arbors 30, 31 are locked, the turret 15 is halted but held under slight force, and power from the motor 10 is applied to the gears 11. The gears 11 drive the spindle 13 and flyer 17, and also drive a cam drive, one-way clutch 93. The cam drive, one-way clutch 93 is any suitable drive coupling which transmits power in one direction, in this case from the gears 11 to the heart cam 14. However, the one-way clutch 93 is so arranged that if the cam 14 is driven from some other source, the one-way clutch 93 does not transmit this power or drive back to the gears 11. Such clutches are known in the art. (As mentioned earlier, the gears 11 are so arranged that for each revolution of the spindle 13 and flyer 17, the heart cam 14 and the adjustable stroke cam 37 cause the flyer 17 to move longitudinally one wire diameter. Ideally, this longitudinal movement would be in discrete steps at the completion of each turn so that the flyer 17 could lay the wire on the subsequent turn at the ideal and desired wire location. Since this movement is difficult to obtain, the uniform motion of the heart cam 14 is used, the cams being adjusted so that the flyer 17 accurately directs each turn on at the desired wire location only at the halfway point in each turn. When laying the wire before the halfway point of each turn, the flyer 17 is behind the ideal location, or toward the previous turn. When laying the wire after the halfway point of each turn, the flyer 17 is ahead of the ideal location, or toward the subsequent turn. For most wire sizes, this variance is tolerable because the wire will fall or be forced into its ideal location.) Rotation of the flyer 17 continues, and the heart cam 14 and adjustable stroke cam 37 cause the rotating flyer 17 to move back and forth so that the wire turns are laid precisely. As the flyer 17 rotates, its revolutions are counted by a revolution counter 94. When the proper number of turns have been provided, the revolution counter 94 presents a suitable signal to the control 90 which then removes power from the gears 11. This stops rotation and longitudinal travel of the flyer 17.

The full number of desired turns may be provided at any longitudinal point in the flyer stroke so that when a coil is completed, the heart cam 14 may be at some position other than its initial or start position. Before the heart cam 14 and the flyer 17 are returned to their start position, the control 90 operates the wire pull and cutoff 16. The retainer pin 76 may also be pushed forward by the control 90. As explained above, the wire pull and cutoff 16 reaches out, engages the span of wire between the last turn and the third flyer wire pulley 22, and pulls this span of wire back. Since the wire on the completed coil is fixed, wire is pulled through the spindle 13 from the source of wire. When the wire pull and cutoff 16 reaches its retracted position, the wire is clamped and cut off on the side toward the finished coil. This frees the completed coil, and the turret 15 may then be withdrawn or retracted so that the completed coil may be removed. As the turret 15 is being withdrawn, or after the turret 15 has been withdrawn, the control 90 applies power to the cam reset one-way clutch 92 to cause the heart cam 14 to rotates to its initial or start position. The cam reset one-way clutch 92 is similar to the cam drive one-way clutch 93, and transmits rotational power from the control 90 to the cam 14. But, rotation of the cam 14 by the cam drive one-way clutch 93 does not transmit power back through the cam reset one-way clutch 92. As the cam 14 is rotated by the cam reset one-way clutch 92, a cam position indicator 95, which may either be a mechanical arm on a rotating plate or some electrical device indicates when the cam 14 is in the initial or start position. When the cam 14 is in the start position, a signal is provided to the control 90 which then stops rotation of the cam reset one-way clutch 92. During the time that the cam reset one-way clutch 92 is rotated, the flyer 17 does not rotate, but is moved longitudinally back to the right to its initial or start position.

During this time, the wire pull and cutoff 16 is still holding the end of the wire from the third flyer wire pulley 22. The operator or the control, after a winding form has been prepared, then initiates another operation. The turret 15 is advanced, after which the control 90 applies power to the gears 11. This causes the flyer 17 to rotate, and lay the wire in the groove 75 of the upper turret arbor flange 67 and wrap the wire around the winding form 18. The flyer 17 continues to rotate and move to the left to complete a layer, then back to the right for another layer, and so on. The operation continues in the same manner as described for the preceding winding cycle.

It will be seen that the machine provides many features which can be automatically controlled. If desired, the flyer 17 may be stopped after any predetermined number of revolutions, the wire pull and cutoff 16 advanced to pull out the wire and provide a tap after any such number of turns, and then the winding completed. The operation may be made as automatic as desired, or may be made to utilize an operator as desired, or some suitable automatic and manual combination. Generally, an operator may be desirable to insert pieces of tape or suitable material along the vertical front and back sides of the winding form for holding the turns in place after winding, and for removing and inspecting completed coils. However, a suitable device or machine may be provided to provide this or any other function.

*Conclusion*

It will be seen that the invention provides a new and improved winding method and coil winding machine of the flyer type in which a precision wound coil may be accurately and quickly made on a dimensionally rigid and stable winding form. The winding form provided by the coil winding machine may be contracted after winding so as to permit the completed winding to be easily removed. The coil winding machine lends itself to any type of operation, either automatic or manual, or to any combination of manual and automatic operation. Not only does the machine provide a flyer type winding for a precision coil, but the machine may be stopped at any point in the winding operation to perform any desired function on the coil. Many modifications of the machine are possible. For example, the turret may be stationary and the flyer and spindle arbor may be moved toward the turret. The flyer may be supplied with wire from some other source, such as a reel or spool mounted on the flyer and spindle. Other devices for longitudinally moving the flyer back and forth, and other types of flyer motion may also be used in place of the uniform motion provided by the heart cam and adjustable stroke cam. Also, the flyer could be longitudinally stationary, and the turret could traverse for wire layering. The wedge and jaws may be reversed and mounted on the turret arbor and spindle arbor respectively. And other locking structures may be substituted for the wedge and jaws. Therefore, while the invention has been described with reference to a particular embodiment, it is to be understood that modifications may be made without departing from the spirit of the invention or from the scope of the claims.

What I claim as new and desire to secure by Letters Patent of the United States is:

1. A machine for stationary winding of coils comprising: a rotatable shaft; a winding arm; means slidably mounting said winding arm on said shaft to rotate said winding arm with said shaft; a shaft coil form portion; means rotatably mounting said shaft coil form portion on one end of said shaft so that said shaft coil form portion may be held fixed against rotation of said shaft; a second coil form portion, means for nonrotatably mounting said second coil form portion for longitudinal movement relative to said one end of said shaft; said coil form portions having mating portions which, when engaged, provide a stationary winding form; means for rotating said shaft and said winding arm; and means for moving said winding arm along said shaft in a predetermined relation thereby to wind a coil on the stationary winding form.

2. A rotating arm type machine for winding coils comprising: an elongated shaft having a longitudinal axis; means mounting said shaft on said machine for rotation about said axis; a wire feeding arm; means mounting said wire feeding arm on said shaft for rotating said arm with said shaft and for sliding said arm along said shaft parallel to said axis; a shaft winding form; means rotatably mounting said shaft winding form on one end of said shaft so that said shaft winding form may be held fixed against rotation of said shaft; a second winding form; means for nonrotatably mounting said second winding form on said machine for longitudinal movement toward and away from said shaft along said axis; said winding forms having mating portions which engage and provide a stationary winding form having predetermined dimensions responsive to the distance said second winding form is moved toward said shaft winding form; means for supplying wire to said wire feeding arm so that turns are provided on said winding form as said shaft rotates; and means for rotating said shaft and for moving said wire feeding arm along said longitudinal axis a distance approximately equal to the diameter of said wire for each revolution of said shaft.

3. A machine for winding coils on a stationary form, comprising: a machine bed; an elongated spindle having a longitudinal axis and mounted on said bed for rotation about said longitudinal axis; a winding arm; means mounting said arm on said spindle for rotating said arm with said spindle about said longitudinal axis in response to rotation of said spindle; said arm being movable along said spindle parallel to said longitudinal axis; rotating means connected to said spindle; reciprocating means connected to said arm for moving said arm back and forth longitudinally along said spindle; a first coil form portion mounted in fixed longitudinal relation and in rotatable relation with respect to one end of said spindle; a second coil form portion, means for nonrotatably mounting said second coil form portion in movable longitudinal relation with respect to said one end of said spindle so that said portions engage and provide a stationary winding form when said second portion is moved toward said first portion; and means connected to said spindle and to said arm mounting means for rotating said spindle and said arm and for reciprocating said arm in a predetermined relation.

4. A machine for winding coils on a stationary form, comprising: a machine bed; an elongated spindle mounted on said bed for rotation about the longitudinal axis of said spindle; rotating means connected to said spindle; a spindle coil form portion; means rotatably mounting said spindle portion on said spindle coil form at one end thereof so that said spindle coil form portion can remain stationary against rotation of said spindle; a nonrotatable coil form portion mounted on said machine bed near said one end of said spindle; means for nonrotatably mounting said nonrotatable coil form for movement along said longitudinal axis toward and away from said spindle coil form portion; said two portions having engageable and mating elements which, when said second portion is moved into contact with said spindle portion, provide a rigid, stationary, and flanged winding form; a winding arm; means for movably mounting said winding arm on said spindle for rotation about said longitudinal axis with said spindle; and said winding arm having means for winding a wire on said winding form; and means for reciprocating said arm longitudinally along said spindle thereby to wind a coil on said flanged winding form.

5. The winding machine of claim 4 wherein said engageable and mating elements comprise a wedge mounted on said spindle portion and having outer sloping surfaces, and a pair of movable jaws mounted on said second portion and having inner sloping surfaces for engaging said wedge outer surfaces to separate said jaws.

6. The winding machine of claim 5 wherein said engageable and mating elements comprise a locking key and a locking slot which, when engaged, hold said second portion against movement when wire is wound on said winding form.

7. The winding machine of claim 4, and further comprising wire supplying means for providing wire to said arm winding means.

8. The winding machine of claim 7, and further comprising means mounted on said machine bed for holding the end of the wire on said arm at the beginning of a winding operation, and for holding and cutting the wire on said arm at the end of a winding operation to free the completed winding and hold the end of the wire on said arm at the beginning of the next winding operation.

References Cited

UNITED STATES PATENTS

| | | | |
|---|---|---|---|
| 789,904 | 5/1905 | Foss | 242—82 XR |
| 1,951,187 | 3/1934 | Dierking | 242—81 |
| 2,668,016 | 2/1954 | Huse | 242—3 |
| 2,782,809 | 2/1957 | Smallridge. | |
| 3,106,351 | 10/1963 | Fulton. | |
| 3,263,309 | 8/1966 | Carman et al. | |
| 3,273,811 | 9/1966 | Mueller. | |

BILLY S. TAYLOR, *Primary Examiner.*